Dec. 19, 1961   C. S. REED ET AL   3,013,584
SUPPORTING MEMBERS

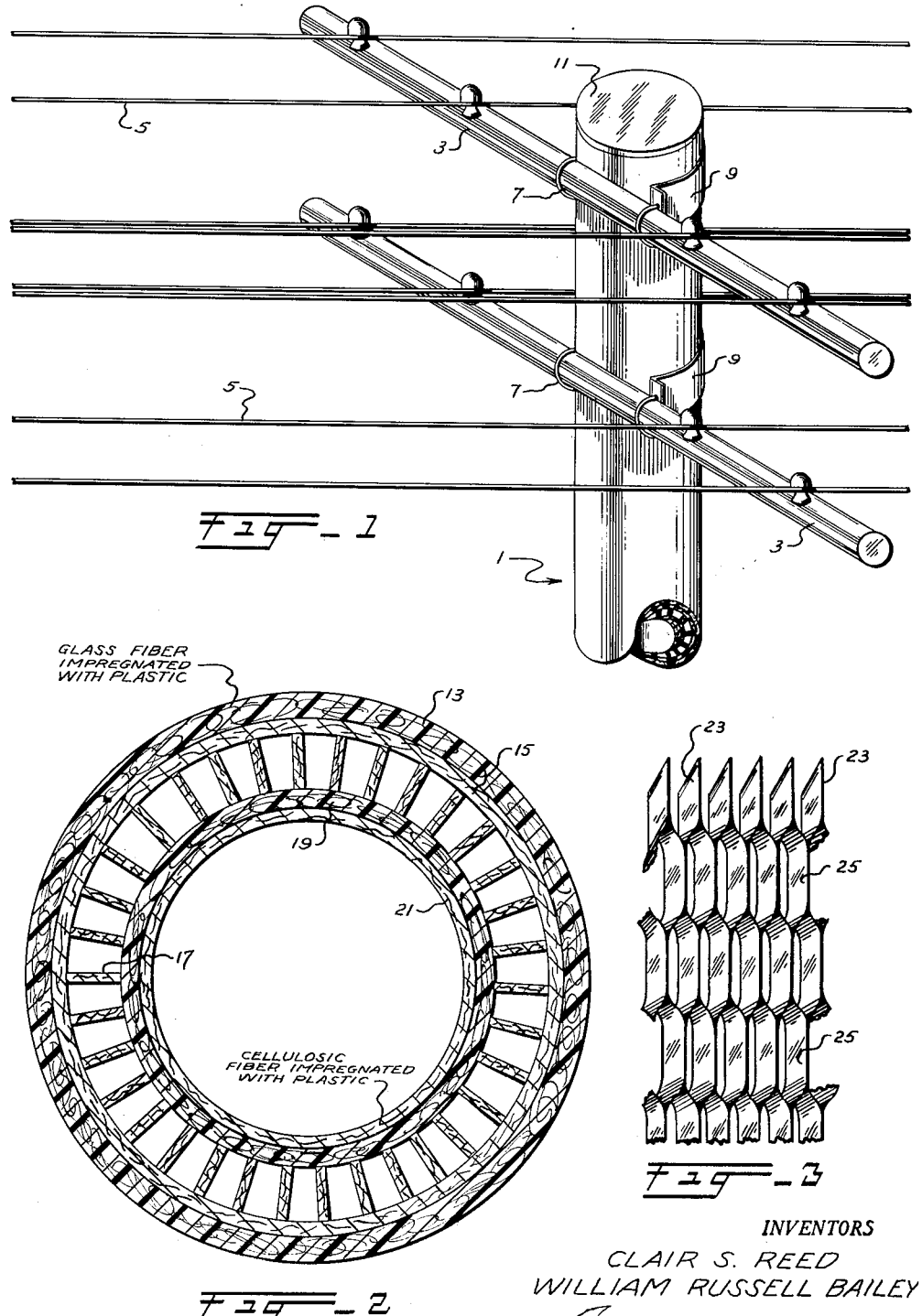

Filed March 28, 1955   2 Sheets-Sheet 2

INVENTOR.
CLAIR S. REED
WILLIAM RUSSELL BAILEY
By Townsend + Beaman
Atty

United States Patent Office 3,013,584
Patented Dec. 19, 1961

3,013,584
SUPPORTING MEMBERS
Clair S. Reed, Wayne, Mich., and William Russell Bailey, Washington, D.C., assignors to Gar Wood Industries, Wayne, Mich.
Filed Mar. 28, 1955, Ser. No. 497,182
22 Claims. (Cl. 138—145)

The present invention relates to supporting members and more particularly to electric utilities poles such as telephone poles, electric power poles, light poles, and the like.

Heretofore, the art has endeavored to provide supporting members such as electric utilities poles which would combine strength and rigidity in lateral flexure with light weight, low cost, and long service life. It has been proposed to form such poles from metal tubing; but they were then found to be exceedingly heavy, subject to corrosion, and, when used as electric utilities poles, productive of undesirable electric phenomena. It has also been proposed to form supporting members such as electric utilities poles from reinforced concrete. However, the great weight of such poles renders them highly impractical for large scale use as electric utilities poles.

Although many attempts were made to overcome the foregoing difficulties and other disadvantages, none, so far as we are aware, was entirely successful when carried into practice commercially on an industrial scale.

It has now been discovered that supporting members of great rigidity and flexural strength may be comprised of tubular sheaths of glass fibers disposed longitudinally of the member and impregnated with a thermosetting resin. It has also been discovered that the rigidity and flexural strength of such supporting members may be greatly increased by the provision of a liner comprising a tubular sleeve made up of a plurality of radially disposed circumferentially spaced-apart strips of cellulosic fiber impregnated with a thermosetting resin.

Accordingly, it is an object of the present invention to provide a supporting member having both high rigidity and great flexural strength.

Another object of the invention is to provide an electric utilities pole which will be light in weight and inexpensive to construct, but which will exceed minimum requirements of strength and durability in service.

The invention also contemplates supporting members having liners comprising tubular sheaths of honeycomb material.

It is a further object of the invention to provide a supporting member comprising a tubular sheath at least partially filled with a plastic foam.

Still another object of the invention is to provide a composite supporting member in which the strength and rigidity of each component greatly augments the strength and rigidity of each other component.

Finally, it is an object of the present invention to provide a supporting member in which the outer casing is comprised of a plurality of laminations.

Other objects and advantages will become apparent from the following description taken in conjunction with the accompanying drawings, in which:

FIGURE 1 is a perspective view of the upper portion of an electric utilities pole illustrating by way of example one environment in which a supporting member according to our invention may be used;

FIGURE 2 is a cross-sectional view of the main body portion of the electric utilities pole of FIGURE 1;

FIGURE 3 is a fragmentary perspective view of a portion of honeycomb liner according to our invention;

Figure 4:
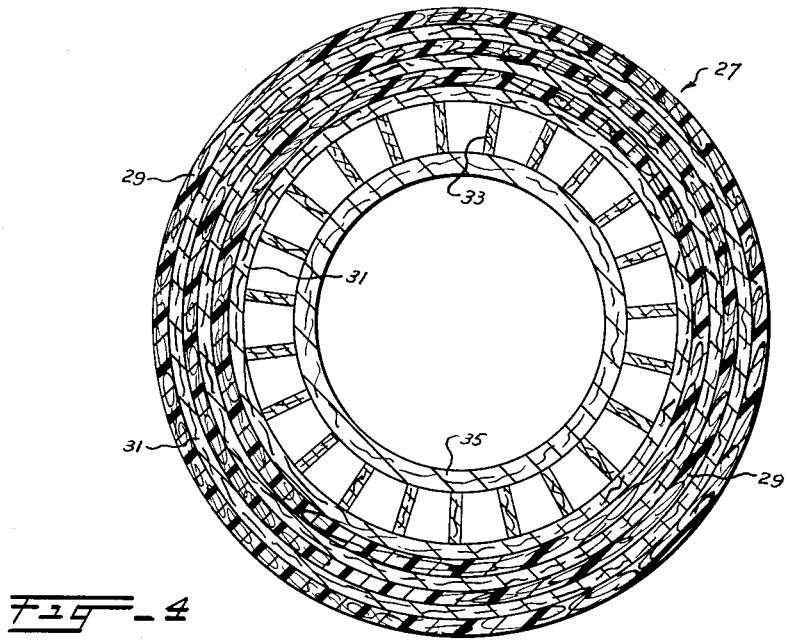
FIGURE 4 is a cross-sectional view similar to FIGURE 2 but showing one of the various embodiments in which our invention may be practiced.

Broadly stated, the present invention comprises the provision of supporting members such as electric utilities poles comprising a tubular sheath of glass fibers disposed longitudinally of the member and impregnated with a resin. The invention also comprises such members in combination with a liner for the sheath, comprising a tubular sleeve of cellulosic fiber impregnated with a thermosetting resin. Moreover, the invention also comprises a supporting member comprising a tubular sheath of alternate layers of longitudinal glass fibers, and cellulosic fibers, all the fibers being impregnated with thermosetting resin. Furthermore, the invention includes supporting members such as the above three, in combination with a plastic foam filling at least a portion of the interior of the member. Most particularly, the invention includes supporting members such as those described above in combination with a honeycomb liner comprising a tubular sleeve made up of a plurality of radially disposed circumferentially spaced-apart strips of cellulosic fiber impregnated with a thermosetting resin. Finally, the invention includes the above features in various combinations.

For purposes of this application, the following definitions of terms will apply:

A "thermosetting resin" is a heat hardening plastic capable of changing from a soluble and fusible solid to an insoluble and infusible solid on heating, and including such synthetic plastics as epoxy resins, polyester resins, phenolaldehyde resins such as Bakelite, formica, micarta or phenolic, polyalcohol-phthalic anhydride esters, urea-formaldehyde and thiourea-formaldehyde resins, or aniline formaldehyde resins, and the like.

An "epoxy resin" is the reaction product of an epihalohydrin and a polyhydric phenol. Typical epihalohydrins are epichlorhydrin, epibromhydrin, and epiiodohydrin. The latter materials are all characterized by a three-carbon chain; however, analogs of the aforesaid epihalohydrins may also be used. Examples of the latter are beta-methyl epichlorhydrin and gammamethyl epichlorhydrin. It will be noted that epifluorhydrin and its analogs are not referred to above. Inasmuch as fluorine is rather unreactive in such epoxy compounds, the latter are not contemplated herein. In view of its availability and relatively low cost, epichlorhydrin is preferred. Polyhydric phenols used in the preparation of these epoxide compositions are typified by resorcinol; hydroquinone; bis phenols, such as bis phenol A, predominantly 4,4'-dihydroxy-diphenyl dimethyl methane, with lesser quantities of the 2,2- and 4,2'-isomers present. Preferred polyhydric phenols are dihydric phenols whose mono alkali metal salts have a pH from about 7 to 11; examples of such dihydric phenols are those recited above. Particularly preferred, however, is bis phenol A.

A "polyester resin" is the reaction product of a maleic-polyhydric alcohol ester preferably of a low acid number and a polymerizable alpha-substituted ethylene body, and more particularly, the reaction product of a substantially linear polyhydric alcohol ester of an unsaturated polybasic acid material of the maleic type and a substituted ethylene body of resin-forming characteristics which is co-polymerizable therewith. A filler, preferably of the fibrous type such as cellulose or asbestos may be added to retard spontaneous cure at storage temperatures. Maleic anhydride is the preferred unsaturated polybasic acid material which is esterified, but maleic acid, fumaric acid, or itaconic and citraconic acid and anhydride may be used instead. Fumaric acid gives a quicker-curing ester than maleic. Unless suitably modified, the polybasic acid should be dibasic. Also certain polybasic acids, such as malic and citric, decompose on heating, at least in part, into acids of the maleic type, and the temperature of esterification should be adequate to accomplish the decomposition to a sufficient extent.

With further regard to the definition of a polyester resin, dihydric alcohols are the usual kind of polyhydric alcohols which react with dibasic acids to yield linear molecules or linear polyesters. Diethylene glycol is readily available; and others include ethylene glycol, triethylene glycol, trimethylene glycol, monoethylin, and propylene glycol and its derivatives. Ethylene glycol produces a final molding which is very hard but somewhat brittle; and triethylene glycol shows softness but some toughness. A mixture of dihydric alcohols may be used. The reason that dihydric alcohol is preferred is that, with dibasic acids, they yield soluble polyesters of very high molecular weight; and the higher the molecular weight the faster is the cure when mixed with the polymerizable substituted-ethylene compound. A certain amount of an alcohol containing more than two hydroxyl groups (e.g., glycerol) can be used with the dihydric alcohol, as can also some monohydric or a mixture of higher and lower (monohydric) alcohols, provided the effect of the linear, high-molecular structure is not lost.

Finally, with regard to the definition of polyester resin, the alpha-substituted ethylene compounds are of the general formula $CH_2=CR_1R_2$, where $R_1$ is a negative group such as aryl, vinyl, ethynyl, carboxyl, halogeno, O—CO-alkyl (acyloxy), CO.O.alkyl (carbalkoxy), alkoxy, aldehydo, nitrilo or halovinyl, and $R_2$ is hydrogen or an alkyl group. These compounds are in contrast with maleic acid which is an alpha-beta-substituted ethylene. Actually, the number of polymerizable bodies which are utilizable alone is limited by the solubility relations between these compounds and the maleic polyester. The maleic polyesters are miscible with most esters, aldehydes and ketones and less so with ethers and aromatic and chlorinated hydrocarbons. They are substantially immiscible with aliphatic hydrocarbons. Hence, such compounds as coumaron, indene, vinyl acetylene, vinyl chloride, butadiene, isobutene and chloroprene are used in conjunction with miscible compounds such as vinyl esters, acrylic esters, methacrylic esters, vinyl ketones, acrolein and vinyl ethers. Also compositions containing a substantial amount of highly volatile compounds like vinyl chloride are more difficult to mold. Styrene is readily applicable.

"Plastic foam" is a light weight rigid mass of which the greatest part of the volume is comprised of entrapped pockets of gas separated by thin, irregular, polygonal webs of thermosetting plastic or thermoplastic, such as phenolic or polystyrene or cellulose acetate.

Referring now to the drawings in greater detail, we have shown in FIGURE 1 the upper portion of a hollow electric utilities pole illustrating one use to which a supporting member according to our invention may be put. Pole 1 is provided with a plurality of cross arms 3 which may also be formed according to the invention for supporting a plurality of wires 5. Cross arms 3 are clamped to pole 1 by means of U-bolts 7 fitted around the cross arms and held tightly against the pole by clamping straps 9. Pole 1 is closed at its top with a cap 11 and at its bottom beneath the surface of the ground with another cap (not shown), for the exclusion of dirt and water from the interior of the pole.

In FIGURE 2, we have shown a cross-sectional view of a supporting member according to our invention. It will be seen that the supporting member forms a closed, hollow cylindrical pole comprised of a plurality of concentric, contiguous tubular sleeves or sheaths. Two of the sleeves in FIGURE 2 are lined to show glass fiber impregnated with plastic; and according to our invention, the plastic is a thermosetting resin. The remaining three sleeves in FIGURE 2 are lined to show cellulosic fiber impregnated with plastic, the plastic also being a thermosetting resin according to our invention. In this way, a supporting member having great structural strength and relatively light weight is provided. The structural strength of such a pole comprises most notably high modulus of elasticity in flexure combined with high bending and ultimate strength. To this end, the glass fibers are disposed longitudinally of the pole and may run full length thereof. Thus, the supporting member of FIGURE 2 comprises an outer casing 13 comprising glass fibers disposed longitudinally of the member and impregnated with a thermosetting resin and a first liner 15 for the outer casing comprising a tubular sleeve of cellulosic fiber impregnated with thermosetting resin. A second liner for the outer casing is also provided, comprising a honeycomb 17 of cellulosic fiber impregnated with thermosetting resin. Although honeycomb 17 does not actually contact outer casing 13, it nevertheless provides a liner for the outer casing, as also for first liner 15. Interiorly of honeycomb 17 is an inner casing 19 comprising a tubular sheath of longitudinally disposed glass fibers impregnated with a thermosetting resin; and interiorly of inner casing 19 is a third liner designated as inner liner 21, comprising a tubular sleeve of solid cellulosic fiber impregnated with a thermosetting resin. It will be noted that first liner 15 and inner liner 21 are composed of solid cellulosic fiber; and the term "solid" is used in this sense to designate a uniform cellulosic fiber as distinguished from honeycomb 17 which has large air spaces throughout. Cellulosic fibers according to this invention may include by way of example cardboard, paper, wood fiber, other types of paper pulp, cotton, and the like. The thermosetting resin used as an impregnant for the cellulosic fiber will preferably be chosen on a cost basis; and for this purpose, a phenolic resin such as a phenolformaldehyde is desirably cheap.

In FIGURE 3, we have shown a perspective view of a fragment of honeycomb material suitable for use as honeycomb 17, roughly full size. It will be noted that the honeycomb is made up of a plurality of relatively thin strips of cellulosic fiber impregnated with a thermosetting resin, such as paper impregnated with phenolic resin. Each such strip 23 is fastened to its next adjacent strip on either side thereof at a plurality of spaced points 25 and is spaced from the next adjacent strip between such points 25. Thus, each strip 23 is roughly vertically disposed and of more or less sinuous form, being bent from one side to the other repeatedly throughout the course of its vertical extent so as to touch the strip 23 on one side alternately with the strip 23 on the other side. Adjacent strips 23 may be fastened together at their points of contact by means of spot gluing or heat welding of the impregnating plastic or the like.

It should also be noted that alternate strips 23 are roughly parallel to each other. Thus, it will be obvious from an inspection of FIGURE 3 that honeycomb 17 could be bent about a horizontal fold line only with the greatest of difficulty, but that it could much more readily be bent about a vertical fold line. Indeed, with the honeycomb oriented as shown in FIGURE 3, it is quite easy to bend a sheet of it into a vertical cylindrical tube; and it is in this form that the honeycomb is employed in the embodiment of FIGURE 2. Thus, the members in FIGURE 2 appearing as radial spokes correspond to the cut-through strips 23 and show that these strips will be substantially radially disposed when the honeycomb is used as a liner element in a composite supporting member of tubular shape according to our invention. It will also be seen that the strips 23 are circumferentially spaced apart about any circumference of the supporting member. Actually of course, adjacent strips 23 contact each other at certain points; and hence, the term "spaced-apart" as used in this specification is intended to include constructions in which the strips are partly spaced-apart and partly contiguous.

IN FIGURE 4, we have shown another embodiment of our invention in cross-section, comprising a supporting member 27 made up of a plurality of relatively thin layers of glass fiber impregnated with a thermosetting resin and disposed longitudinally of the member and spaced-apart by alternately disposed relatively thin layers of cellulosic fiber 31 impregnated with a thermosetting resin. Thus, it will be seen that the outer casing of the embodiment of FIGURE 4 comprises a multi-layer, composite or laminated tubular sandwich comprised of a layer of glass fiber, a layer of cellulose fiber, a layer of glass fiber, a layer of cellulose fiber, and so on. The outer layer may of course be either glass fiber or cellulosic fiber; but as the layers of glass fiber are ordinarily somewhat stronger than those of cellulosic fiber, it is preferred to form the outermost layer of impregnated glass fiber. The innermost layer may be either glass fiber or cellulosic fiber. Alternatively, instead of forming the composite from a plurality of annular cylindrical layers, the supporting member outer casing of FIGURE 4 may be formed by rolling up a single, continuous web of a layer of glass fiber on a layer of cellulose fiber, or vice versa, into a composite roll. Such single webs are preferably of a width equal to the desired length of the supporting member. The glass fiber and cellulosic fibers may be respectively impregnated with different thermosetting resins; but for purposes of simplicity it is preferred to impregnate the laminated unit with a single composition comprising a thermosetting resin or a mixture of various resins, at least a major portion of which are thermosetting resins. Thus, a honeycomb 33 similar to honeycomb 17 of FIGURES 2 and 3 is provided interiorly of the outer casing as a liner therefor, and an inner liner 35 is provided as a further liner. Honeycomb 33 and inner liner 35 are of cellulosic fiber impregnated with thermosetting resin. It will be noted that apart from the laminated construction of the outer casing, the embodiment of FIGURE 4 differs from that of FIGURE 2 in that there is no inner casing of glass fiber corresponding to element 19 in the embodiment of FIGURE 2. Hence, it will be seen that various combinations of liner interiorly of the honeycomb liner may be employed. It has been found that a supporting member such as illustrated in FIGURE 4 has extremely high ultimate strength without being brittle.

Figure 5:
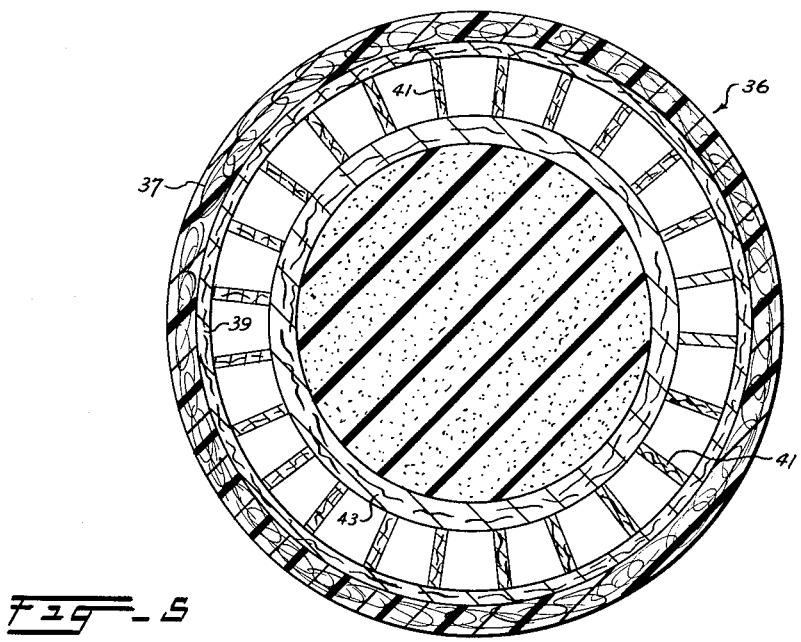
FIGURE 5 is another cross-sectional view similar to FIGURE 2 but showing still another embodiment of our invention.

In FIGURE 5, we have shown still another embodiment of our invention comprising a supporting member 36 comprising an outer casing 37 of glass fiber longitudinally disposed and impregnated with a thermosetting resin, a first liner comprising a layer 39 of cellulosic fiber impregnated with thermosetting resin, a second liner comprising honeycomb 41 of cellulosic fiber impregnated with thermosetting resin, and a third liner comprising an inner lining 43 of cellulosic fiber impregnated with thermosetting resin. However, it will be noted that in the embodiment of FIGURE 5 shown in cross-section, the central void of the supporting member is filled over at least a portion of its length with a plastic foam. It will be seen that the embodiment of FIGURE 5 is basically that of FIGURE 2 with the addition of plastic foam; and it has been found that a supporting member constructed according to FIGURE 5 will have substantially greater flexural strength than an otherwise similar member constructed according to FIGURE 2, despite the fact that plastic foam by itself has virtually no actual strength.

Throughout the drawings, the same symbols indicate the same materials. Thus, FIGURE 2 is specifically lined for glass fiber impregnated with plastic; and according to the invention, this comprises longitudinally disposed glass fiber impregnated with a thermosetting resin. Thus, throughout the drawings, that same symbol designates that same material, as also in the case of the cellulosic liners and plastic foam.

The foregoing illustrated embodiments are illustrative only and by no means exhaustive of the various embodiments in which our invention may be practiced. It will be appreciated that various combinations of cross-sectional contour, joint structure and combinations of casing, liner and foam may be made by those skilled in the art without departing from the spirit or scope of our invention.

For the purpose of giving those skilled in the art a better understanding of the invention and a better appreciation of the advantages thereof, the following illustrative examples are given:

*Example I*

A liner of cellulosic fiber impregnated with a thermosetting resin, according to our invention, was formed from a cardboard tube known as a "kraft" tube having an inside diameter of 2 inches and a wall thickness of 0.060 inch. The tube was impregnated with phenolic resin which was then condensed at elevated temperature until maximum hardness and strength were reached. The phenolic resin was that type sold commercially by the Synvar Corporation as "Synvar CP66X," a phenol-formaldehyde resin which is alcohol-water soluble before condensation. The tube was then clamped by one end in a dynamometer and an increasing lateral pull exerted at a distance of 56 inches above the base. At a lateral pull of 5 pounds, the lateral deflection was 2 inches. The lateral pull was increased above 5 pounds and the tube soon bent and broke. Thus it was seen that the liner alone possessed very little flexural strength. The modulus of elasticity of the tube in lateral flexure was calculated according to the well known formula $$E=\frac{Pl^3}{3yI}$$

where E equals the flexural modulus of elasticity, P equals the lateral force, $l$ equals the distance from the base at which the force is applied, $y$ is the lateral deflection at that P, and I is the moment of inertia of the body tested. P is known to be 5 pounds, $l$ is 56 inches and $y$ is 2 inches; but I must be calculated according to the formula $$I=\frac{\pi}{4}(a_o4-a_i4)$$

where $a_o$ is the outside radius of the tube and $a_1$ is the inside radius of the tube. $a_o$ is known to be 1.060 inches and $a_1$ is known to be 1.000 inch, with the result that the moment of inertia I is calculated to be 0.206 inch$^4$. Thus, substituting in the first formula, the flexural modulus of elasticity E is found to be 712,000 pounds per square inch.

*Example II*

A round tube was formed from longitudinally disposed glass fibers running full length thereof and impregnated with a cured epoxy resin. The glass fiber was in the form of unidirectional glass cloth, that is to say, cloth in which almost all of the fibers run in one direction, only an occasional cloth fiber being provided to hold the cloth together laterally. The glass fibers running in the principal direction longitudinally of the completed tube were from 0.00020 to 0.00025 inch in diameter. The epoxy resin was that type sold commercially by the Shell Chemical Corporation as "Epon 828," an epoxy resin having a melting point of 9° C., a viscosity of 12,400 centipoises at 25° C., a specific gravity at room temperature of 1.1676, an epoxy value of 0.52 as measured by the pyridinum chloride method, a hydroxol value of 0.08 as measured by the lithium aluminum hydride method, and an esterification value of 1.26. The glass cloth was preheated to drive off the moisture and immersed in the resin bath which was held at around 150° F. The bath contained a catalyst comprising a monoethylamine complex of boron trifluoride, in an amount of 5% by weight. The excess resin was then pressed from the sheet, the sheet formed to shape and run through a curing furnace or oven where it was held at around 250° F. for about 45 minutes until it had cured to maximum hardness and strength. The completed tube had an inside diameter tapering from 2,022 inches to 2.144 inches and a wall thickness of 0.038 inch. The tube contained 50.1% resin, remainder glass. The tube was clamped in a dynamometer as in the previous example, and a force applied 56 inches above the base. A lateral force of 29.9 pounds produced a lateral deflection of 6 inches; and the tube failed shortly thereafter. The flexural modulus of elasticity was calculated by the above method at 2,045,000 pounds per square inch.

The ultimate strength of the tube, that is, the unit area stress in the tube at failure, was calculated according to the formula $$S_m = \frac{Mc}{I}$$

where $S_m$ is the stress at failure, M is the moment or breaking force times distance, c equals $a_o$ which is the outside radius of the tube, and I is the moment of inertia of the body tested. Thus, the breaking stress $S_m$ is calculated in this case to be 12,640 pounds per square inch.

*Example III*

A pole was constructed having a general cross-sectional arrangement comprising that portion of FIGURE 2 that is represented by outer casing 13 and first liner 15, or by inner casing 19 and inner liner 21. The pole was a composite tube of two sleeves. A "kraft" tube having an inside diameter of 2 inches and a wall thickness of 0.070 inch and impregnated with phenolic resin as in Example I was disposed inside a tube of glass fiber impregnated with an epoxy resin and having a 2.140 inch inside diameter and a wall thickness of 0.034 inch. The outer casing of glass fiber was constructed in the same manner as in Example II, except that as a catalyst, 23% of metaphenylamine diamine was used in the resin bath. The casing contained 35.2% resin by weight, remainder glass. When tested in the dynamometer as in the above examples, the composite tube showed a deflection of 6 inches when a force of 50.7 pounds was applied 56 inches from the base and in a lateral direction. The composite tube finally broke under a pressure of 117 pounds applied laterally and at a lateral deflection of 16¼ inches. In order to calculate the modulus of elasticity of the outer casing of impregnated glass fiber, it was necessary to work from the known modulus of elasticity of the impregnated "kraft" tube, as found in Example I. Thus, the stress values for the liner impregnated with phenolic resin could be found from the following formula:

$$P_1 = \frac{3 E_1 I_1 y}{l^3}$$

The subscript 1 is used to designate the values and symbols relating to the liner; and the subscript 2 will be used to designate the values and symbols pertaining to the outer casing of impregnated glass fiber. Thus, for a liner modulus of elasticity of 712,000 pounds per square inch, a liner moment of inertia of 0.244 inch⁴, a lateral deflection of 6 inches and a length of 56 inches, $P_1$ is calculated to be 17.8 pounds. $P_2$ is the total P minus $P_1$, or 32.9 pounds. Thus, the values are now available for substitution in the formula to determine the modulus of flexural elasticity of the outer glass fiber casing:

$$E_2 = \frac{P_2 l^3}{3 y I_2}$$

where $P_2$ equals 32.9 pounds, $l$ equals 56 inches, $y$ equals 6 inches, and the moment of inertia of the glass fiber outer casing is calculated to be 0.1372 inch⁴. Thus, the modulus of flexural elasticity of the glass outer casing is calculated to be an astonishingly high 2,345,000 pounds per square inch. No reason is known why the combination with the liner should raise the modulus of elasticity of the material of the casing; and it can only be concluded that this result constitutes an unexpected and dramatic improvement in the flexural strength of the casing.

However striking the improvement in the flexural strength of the casing may be by virtue of the addition of the liner, the improvement in the stress at failure was even more marked. Taking the breaking force applied to the casing and liner as portions of the total breaking force proportional to $P_1$ and $P_2$, the stress at failure of the outer casing was calculated at 34,200 pounds per square inch and that of the liner as 10,080 pounds per square inch. Thus, the failure stress of the casing is almost trebled by adding the liner, as will be seen by comparison with Example II.

*Example IV*

Another pole was constructed having the same general cross-sectional arrangement as in Example III. A "kraft" tube having an inside diameter of 2 inches and a wall thickness of 0.032 inch and impregnated with phenolic resin as in Example I was disposed inside a tube of glass fiber impregnated with a polyester resin and having a 2.064 inch inside diameter and a wall thickness of 0.041 inch. The outer casing of glass fiber was constructed in the same manner as in Example II, except that a polyester resin, Celanese "MR–28C Resin," was used. Curing was at 250° F. for one hour. The casing contained 40.9% resin by weight, remainder glass. When tested in the dynamometer as in the above examples, the composite tube showed a deflection of 6 inches when a force of 45 pounds was applied 54 inches from the base and in a lateral direction. The composite tube finally broke under a pressure of 95 pounds applied laterally and at a lateral deflection of 13 inches. When calculated according to the method of Example III, the modulus of flexural elasticity of the glass outer casing is seen to be 2,130,000 pounds per square inch. The stress at failure of the outer casing is 29,700 pounds per square inch and that of the liner is 9,370 pounds per square inch. These figures are seen to be roughly in line with the values for the corresponding calculations of Example III.

*Example V*

Still another pole was constructed having the same general cross-sectional arrangement as in Examples III and IV. A "kraft" tube having an inside diameter of 2 inches and a wall thickness of 0.051 inch and impregnated with phenolic resin as in Example I was disposed inside a tube of glass fiber impregnated with a phenolic resin as in Example I and having a 2.102 inch inside diameter and a wall thickness of 0.035 inch. The phenolic resin of Example I impregnated both the outer casing and the liner. The casing contained 40.9% resin by weight, remainder glass. Curing was conducted for five hours at 180° F., and for one hour at 200° F. When tested in the dynamometer as in the above examples, the composite tube showed a deflection of 6 inches when a force of 47.4 pounds was applied 54 inches from the base and in a lateral direction. The composite tube finally broke under a pressure of 94.6 pounds and at a lateral deflection of 12½ inches. Calculations conducted according to the method outlined in Example III showed that the flexural modulus of elasticity was 2,200,000 pounds per square inch, that the stress at failure of the outer casing was 29,300 pounds per square inch and that of the inner liner 9,040 pounds per square inch. These figures seem to be roughly comparable to the corresponding figures in Examples III and VI.

Example VI

A pole was constructed having a general cross-sectional arrangement as shown in that portion of FIGURE 4 of the drawings which is designated by the reference numerals 29 and 31. That is to say that a pole was constructed corresponding only to the outer casing of the embodiment of FIGURE 4 without the honeycomb liner or the inner liner. Two thicknesses of "50-pound kraft" paper, each thickness 0.005 inch thick, were placed together to form a paper sheet 0.010 inch thick and a thin layer of glass fiber as in Example II was placed on the sheet with the paper and fiber impregnated with the epoxy resin of Example II and the curing catalyst of Example III. On top of this first layer of paper and glass fiber, a second composite layer of paper and glass fiber was placed, and a third, until the structure shown as the outer casing in FIGURE IV was achieved, with alternate layers of paper and glass fiber. The desired tubular cylindrical form was built up on a mandrel. The laminated, multi-layer tube was cured for one hour at 200° F., and for two and one-half hours at 325° F. The thermosetting resin impregnated all layers of the tube and set to a uniformly hard, durable finished product having 54.1% by weight organic content comprising paper and resin, remainder glass. The finished pole had an inside diameter tapering from 2⅛ inches at the base to 2 inches adjacent the upper end and a 0.083 wall thickness. When tested in the dynamometer as in the above examples, the laminated tube showed a deflection of 6 inches when a force 67.2 pounds was applied 54 inches from the base and in a lateral direction. The composite laminated tube finally broke under a pressure of 188.2 pounds applied laterally and at a lateral deflection of 18¼ inches. The flexural modulus of elasticity for the entire tube is calculated at 1,820,000 pounds per square inch. The stress at breaking for the entire tube is calculated at 35,200 pounds per square inch. However, it must be remembered that these figures for modulus of elasticity and ultimate stress are a composite of those for the glass fiber and the paper. Hence, it will be obvious that the values for the glass fiber alone would be substantially higher than the calculated composite figures.

Example VII

A pole was constructed having the general cross-sectional configuration which would be given by filling outer casing 13 or 37 with the plastic foam as shown in FIGURE 5. That is to say that the pole comprised simply a tubular sheath of glass fiber impregnated with epoxy resin and filled with a plastic foam. The outer casing of glass fiber impregnated with epoxy resin was constructed in the same way and from the same materials under the same temperatures with the same time factor and catalyst as in the case of the outer glass fiber shell of Example III. The completed outer shell had an inside diameter tapering from 2.022 inches at the top to 2.144 inches at the bottom and side walls tapering from 0.060 inch in thickness at the top to 0.050 inch thickness at the bottom. The casing contained 36.5% resin by weight, remainder glass. The interior of the casing was filled with plastic foam comprising phenolic foaming resin No. 12,313 of the General Electric Company. The materials for producing this foam were mixed as supplied and directed by that company; and in the resulting exothermic reaction, a foam of cellular thermosetting plastic was produced which quickly solidified as a light, rigid material filling the interior of the pole. The pole was then tested in the dynamometer by the method described above; and at a lateral pressure of 61.5 pounds applied 56 inches above the base, a deflection of 8 inches was noted. The pole finally broke at a pressure of 102 pounds and a lateral deflection of 15¾ inches. When the modulus of elasticity was calculated by the above method, it was found to be an astoundingly high 4,390,000 pounds per square inch. Equally surprising, the stress at breaking was found to be 59,400 pounds per square inch. This result is thought to be truly amazing, since the foam itself has but a negligible flexural strength and modulus of elasticity.

Example VIII

A pole was constructed having the general cross-sectional configuration shown in FIGURE 2 of the drawings. The member corresponding to inner liner 21 comprised a "kraft" tube having an inside diameter of 1.5 inches, and outside diameter of 1.625 inches and a wall thickness of 0.0625 inch. The member corresponding to inner casing 19 comprised glass fiber of the type described in Example II, having an inside diameter of 1.625 inches and an outside diameter of 1.645 inches and a wall thickness of 0.010 inch. The honeycomb liner corresponding to honeycomb 17 had an inside diameter of 1.645 inches, an outside diameter of 2.145 inches and a wall thickness of 0.25 inch. The honeycomb was spread open as in FIGURE 3; and the actual strips occupied 10% of the volume. That is to say that the honeycomb was stretched to ten times its compacted width. The distance between vertically aligned points 25 as seen in FIGURE 3 was about 2 inches. The thickness of strips 23 was about 0.007 inch. The member corresponding to first liner 15 was of "kraft" paper, as was also the honeycomb member, and had an inside diameter of 2.145 inches, an outside diameter of 2.163 inches, and a wall thickness of 0.009 inch. The member corresponding to outer casing 13 was of glass fiber as in Example II and had an inside diameter of 2.163 inches, an outside diameter of 2.223 inches and a wall thickness of 0.030 inch. The cellulosic fiber members were impregnated with a solution of equal parts by weight of ethyl-alcohol and the phenolic resin sold commercially under the trade name "Resinox 44" by the Monsanto Chemical Company. The honeycomb member, which was impregnated separately, contained 18% by weight of this resin. The two glass fiber members were impregnated with the epoxy resin of Example II, 20% by weight of metaphenylamine diamine being used as the catalyst. The completed composite was cured for three-quarters of an hour at 180° F. and for three-quarters of an hour at 250° F. The pole was then tested in the dynamometer by the method described above; and at a lateral pressure of 92.1 pounds applied 54 inches above the base, a deflection of 5 inches was noted. The pole finally failed at a pressure of 221.1 pounds and a lateral deflection of 12 inches.

In order to calculate the stress relationship throughout the composite pole of FIGURE II, it is necessary to examine certain portions of the pole separately. Thus, it will be observed that elements 19 and 21 taken alone form a two-piece composite having the same construction and composition as the pole of Example III, and that the two-piece composite formed by elements 13 and 15 also has this construction and composition. Hence, for purposes of initial calculation, it can be assumed that the stresses in failure for the elements of these portions will be the same as the stresses in failure for the corresponding elements of the pole of Example III. Thus, elements 13 and 19 will be assumed to have a stress at failure of 34,200 pounds per square inch; and elements 15 and 21 will be assumed to have a stress at failure of 10,080 pounds per square inch. Substituting in the stress formula given in Example II, element 21 is found to be carrying 21.55 pounds of the failure load, element 19 is carrying 13.87 pounds, element 15 is carrying 5.31 pounds, and element 13 is carrying 85.6 pounds. Subtracting the sum of these partial loads from the total breaking load of 221.1 pounds, it is seen that the honeycomb member 17 is carrying 94.8 pounds of the failure load. Thus, all of the variables of the stress equation for the honeycomb are known except the moment of inertia, which is calculated according to the formula $$I = \frac{\pi(a_o^4 - a_i^4)0.1}{4}$$

The factor of 0.1 in the above equation is introduced to correct for the fact that the honeycomb is not solid but is highly foraminous. As is well known, the moments of inertia for irregular bodies can usually best be determined by numerical integration, the accuracy of the answer being of course dependent on the size of the increments studied. However, in the case of a foraminous body having a great multiplicity of holes symmetrically arranged, the correction factor may be taken simply as the volume percent of solid material, as in the present case. The result is not mathematically correct; but it is surely as precise as numerical integration and is probably within the range of experimental error which may be present in other portions of the tabulated data.

Thus, the stress in failure of the honeycomb is found to be 80,300 pounds per square inch, and the flexural modulus of elasticity is found to be 6,250,000 pounds per square inch. It may not be entirely realistic to interpret these calculations as indicating that the material of the honeycomb actually bears that high a stress, or that the material of the honeycomb actually has such a high modulus of elasticity. It may be preferable to view the results as indicating that the honeycomb has strengthened the entire tube as though a member having those extraordinary strength characteristics had been inserted. But either way, the result is the same: the tube is dramatically and inexplicably strengthened by the introduction of the honeycomb element to a degree which could not be predicted from a study of the relatively weak honeycomb element taken by itself.

It should be appreciated that the honeycomb configuration shown in FIGURE III is by no means the only arrangement that may be devised for this scope of the present invention. Thus, the pattern of the points of attachment of the strips to each other may be varied and in many cases eliminated entirely.

It will also be appreciated that although the use of unidirectional glass cloth has been described, other forms of glass fiber may be used. For example, glass fiber in the form of a tape comprising a plurality of fibers disposed in substantial parallelism and arranged in the general form of a broad, flat ribbon, may be used. Another convenient form of glass fiber is "roving," which is glass fiber in the form of a plurality of bundles, each bundle comprising in turn a plurality of fibers in substantial parallelism.

It will also be appreciated that with regard to the impregnant for the cellulosic fiber liner, it is not necessary to use pure thermosetting resins. A resin such as a phenolic might be diluted with casein, or even replaced entirely with a sizing material such as starch or casein. If a water-soluble sizing material was substituted for a resin as a liner impregnant, then it would be desirable to coat the interior of such an impregnated liner with some waterproofing material such as polyvinyl chloride or wax or a rubber base compound.

Moreover, it is not necessary that a single thermosetting resin be used for the impregnant either of the glass fiber or the liner of any embodiment of our invention. It will be appreciated that a mixture of thermosetting resin may yield improved properties under certain conditions of manufacture and that various mixtures of thermosetting resins, as well as thermosetting resins mixed with substances that do not substantially alter their properties, are comprehended by the invention.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:

1. A supporting member having an outer casing comprising a tubular sheath of glass fibers disposed longitudinally of said member and impregnated with a thermosetting resin, and a liner for said outer casing comprising a tubular sleeve made up of a plurality of radially disposed circumferentially spaced-apart strips of cellulosic fiber impregnated with a thermosetting resin.

2. A supporting member having an outer casing comprising a tubular sheath of glass fibers disposed longitudinally of said member and impregnated with an epoxy resin, and a liner for said outer casing comprising a tubular sleeve made up of a plurality of radially disposed circumferentially spaced-apart strips of cellulosic fiber impregnated with a thermosetting resin.

3. A supporting member having an outer casing comprising a tubular sheath of glass fibers disposed longitudinally of said member and impregnated with a polyester resin, and a liner for said outer casing comprising a tubular sleeve made up of a plurality of radially disposed, circumferentially spaced-apart strips of cellulosic fiber impregnated with a thermosetting resin.

4. A supporting member having an outer casing comprising a tubular sheath of glass fibers disposed longitudinally of said member and impregnated with a phenolaldehyde resin, and a liner for said outer casing comprising a tubular sleeve made up of a plurality of radially disposed circumferentially spaced-apart strips of cellulosic fiber impregnated with a thermosetting resin.

5. A supporting member having an outer casing comprising a tubular sheath of glass fibers disposed longitudinally of said member and impregnated with a thermosetting resin, and a liner for said outer casing comprising a tubular sleeve made up of a plurality of radially disposed circumferentially spaced-apart strips of cellulosic fiber impregnated with a thermosetting resin, each said strip being fastened to its next adjacent strip at a plurality of spaced points and being spaced from said next adjacent strip between said points.

6. A supporting member having an outer casing comprising a tubular sheath of glass fibers disposed longitudinally of said member and impregnated with an epoxy resin, and a liner for said outer casing comprising a tubular sleeve made up of a plurality of radially disposed circumferentially spaced-apart strips of cellulosic fiber impregnated with a thermosetting resin, each said strip being fastened to its next adjacent strip at a plurality of spaced points and being spaced from said next adjacent strip between said points.

7. A supporting member having an outer casing comprising a tubular sheath of glass fibers disposed longitudinally of said member and impregnated with a polyester resin, and a liner for said outer casing comprising a tubular sleeve made up of a plurality of radially disposed, circumferentially spaced-apart strips of cellulosic fiber impregnated with a thermosetting resin, each said strip being fastened to its next adjacent strip at a plurality of spaced points and being spaced from said next adjacent strip between said points.

8. A supporting member having an outer casing comprising a tubular sheath of glass fibers disposed longitudinally of said member and impregnated with a phenolaldehyde resin, and a liner for said outer casing comprising a tubular sleeve made up of a plurality of radially disposed circumferentially spaced-apart strips of cellulosic fiber impregnated with a thermosetting resin, each said strip being fastened to its next adjacent strip at a plurality of spaced points and being spaced from said next adjacent strip between said points.

9. A supporting member having an outer casing comprising a tubular sheath of glass fibers disposed longitudinally of said member and impregnated with a thermosetting resin, a liner for said outer casing comprising a tubular sleeve made up of a plurality of radially disposed circumferentially spaced-apart strips of cellulosic fiber impregnated with a thermosetting resin, and a liner for said casing liner comprising a tubular sleeve of solid cellulosic fiber impregnated with a thermosetting resin.

10. A supporting member having an outer casing comprising a tubular sheath of glass fibers disposed longitudinally of said member and impregnated with a polyester resin, a liner for said outer casing comprising a tubular sleeve made up of a plurality of radially disposed circumferentially spaced-apart strips of cellulosic fiber impregnated with a thermosetting resin, and a liner for said casing liner comprising a tubular sleeve of solid cellulosic fiber impregnated with a thermosetting resin.

11. A supporting member having an outer casing comprising a tubular sheath of glass fibers disposed longitudinally of said member and impregnated with an epoxy resin, a liner for said outer casing comprising a tubular sleeve made up of a plurality of radially disposed circumferentially spaced-apart strips of cellulosic fiber impregnated with a thermosetting resin, and a liner for said casing liner comprising a tubular sleeve of solid cellulosic fiber impregnated with a thermosetting resin.

12. A supporting member having an outer casing comprising a tubular sheath of glass fibers disposed longitudinally of said member and impregnated with a phenol-aldehyde resin, a liner for said outer casing comprising a tubular sleeve made up of a plurality of radially disposed circumferentially spaced-apart strips of cellulosic fiber impregnated with a thermosetting resin, and a liner for said casing liner comprising a tubular sleeve of solid cellulosic fiber impregnated with a thermosetting resin.

13. A supporting member having an outer casing comprising a tubular sheath of alternate layers of glass fibers which are disposed longitudinally of said member and impregnated with a thermosetting resin, and cellulosic fiber impregnated with a thermosetting resin, and a liner for said outer casing comprising a tubular sleeve made up of a plurality of radially disposed circumferentially spaced-apart strips of cellulosic fiber impregnated with a thermosetting resin.

14. A supporting member having an outer casing comprising a tubular sheath of alternate layers of glass fibers which are disposed longitudinally of said member and impregnated with an epoxy resin, and cellulosic fiber impregnated with a thermosetting resin, and a liner for said outer casing comprising a tubular sleeve made up of a plurality of radially disposed circumferentially spaced apart strips of cellulosic fiber impregnated with a thermosetting resin.

15. A supporting member having an outer casing comprising a tubular sheath of alternate layers of glass fibers which are disposed longitudinally of said member and impregnated with a polyester resin, and cellulosic fiber impregnated with a thermosetting resin, and a liner for said outer casing comprising a tubular sleeve made up of a plurality of radially disposed circumferentially spaced apart strips of cellulosic fiber impregnated with a thermosetting resin.

16. A supporting member having an outer casing comprising a tubular sheath of alternate layers of glass fibers which are disposed longitudinally of said member and impregnated with a phenol-aldehyde resin, and cellulosic fiber impregnated with a thermosetting resin, and a liner for said outer casing comprising a tubular sleeve made up of a plurality of radially disposed circumferentially spaced apart strips of cellulosic fiber impregnated with a thermosetting resin.

17. A supporting member having an outer casing comprising a tubular sheath of alternate layers of glass fibers which are disposed longitudinally of said member and impregnated with a thermosetting resin, and cellulosic fiber impregnated with a thermosetting resin, and a liner for said outer casing comprising a tubular sleeve made up of a plurality of radially disposed circumferentially spaced-apart strips of cellulosic fiber impregnated with a thermosetting resin, each said strip being fastened to its next adjacent strip at a plurality of spaced points and being spaced from said next adjacent strip between said points.

18. A supporting member having an outer casing comprising a tubular sheath of alternate layers of glass fibers which are disposed longitudinally of said member and impregnated with an epoxy resin, and cellulosic fiber impregnated with a thermosetting resin, and a liner for said outer casing comprising a tubular sleeve made up of a plurality of radially disposed circumferentially spaced apart strips of cellulosic fiber impregnated with a thermosetting resin, each said strip being fastened to its next adjacent strip at a plurality of spaced points and being spaced from said next adjacent strip between said points.

19. A supporting member having an outer casing comprising a tubular sheath of alternate layers of glass fibers which are disposed longitudinally of said member and impregnated with a polyester resin, and cellulosic fiber impregnated with a thermosetting resin, and a liner for said outer casing comprising a tubular sleeve made up of a plurality of radially disposed circumferentially spaced-apart strips of cellulosic fiber impregnated with a thermosetting resin, each said strip being fastened to its next adjacent strip at a plurality of spaced points and being spaced from said next adjacent strip between said points.

20. A supporting member having an outer casing comprising a tubular sheath of alternate layers of glass fibers which are disposed longitudinally of said member and impregnated with a phenol-aldehyde resin, and cellulosic fiber impregnated with a thermosetting resin, and a liner for said outer casing comprising a tubular sleeve made up of a plurality of radially disposed circumferentially spaced-apart strips of cellulosic fiber impregnated with a thermosetting resin, each said strip being fastened to its next adjacent strip at a plurality of spaced points and being spaced from said next adjacent strip between said points.

21. A supporting member having an outer casing comprising a tubular sheath of glass fibers disposed longitudinally of said member, a first liner for said outer casing comprising a tubular sleeve of solid cellulosic fiber, a second linier for said first liner comprising a tubular sleeve made up of a plurality of radially disposed circumferentially spaced-apart strips of cellulosic fiber impregnated with a thermosetting resin, and a third liner for said second liner comprising a tubular sleeve of solid cellulosic fiber, said outer casing and three liners being impregnated with thermosetting resin.

22. A supporting member having an outer casing comprising a tubular sheath of glass fibers disposed longitudinally of said member, a first liner for said outer casing comprising a tubular sleeve of solid cellulosic fiber, a second liner for said first liner comprising a tubular sleeve made up of a plurality of radially disposed circumferentially spaced-apart strips of cellulosic fiber impregnated with a thermosetting resin, each said strip being fastened to its next adjacent strip at a plurality of spaced points and being spaced from said next adjacent strip between said points, and a third liner for said second liner comprising a tubular sleeve of solid cellulosic fiber, said outer casing and three liners being impregnated with thermosetting resin.

References Cited in the file of this patent

UNITED STATES PATENTS

| | | |
|---|---|---|
| 1,930,285 | Robinson | Oct. 10, 1933 |
| 2,434,465 | Marc | Jan. 13, 1948 |
| 2,466,271 | Pfleumer | Apr. 5, 1949 |
| 2,552,599 | Stout | May 15, 1951 |

(Other references on following page)

UNITED STATES PATENTS

| | | |
|---|---|---|
| 2,571,692 | Dubois | Oct. 16, 1951 |
| 2,571,717 | Howald et al. | Oct. 16, 1951 |
| 2,594,838 | Alexander et al. | Apr. 29, 1952 |
| 2,602,037 | Nelb | July 1, 1952 |
| 2,626,223 | Sattler et al. | Jan. 20, 1953 |
| 2,653,887 | Slayter | Sept. 29, 1953 |
| 2,668,327 | Steele | Feb. 9, 1954 |
| 2,694,661 | Meyer | Nov. 16, 1954 |
| 2,815,795 | Vander Poel | Dec. 10, 1957 |

OTHER REFERENCES

Publication "Modern Plastics," November 1950, pages 113, 114, 116, 118, 120, 122. (Copy in Div. 67.) "Epoxy Resins in Glass Cloth Laminates."